US012637220B2

(12) United States Patent
Kallabettu et al.

(10) Patent No.: US 12,637,220 B2
(45) Date of Patent: *May 26, 2026

(54) AIRCRAFT SEAT WITH MOVEABLE HEADREST

(71) Applicant: Safran Seats GB Limited, Cwmbran (GB)

(72) Inventors: Mayur Kallabettu, Cwmbran (GB); Simon Meredith, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 210 days.

This patent is subject to a terminal disclaimer.

(21) Appl. No.: 18/567,269

(22) PCT Filed: Jun. 9, 2022

(86) PCT No.: PCT/GB2022/051441
§ 371 (c)(1),
(2) Date: Dec. 5, 2023

(87) PCT Pub. No.: WO2022/258971
PCT Pub. Date: Dec. 15, 2022

(65) Prior Publication Data
US 2024/0270389 A1 Aug. 15, 2024

(30) Foreign Application Priority Data

Jun. 11, 2021 (GB) ...................................... 2108401

(51) Int. Cl.
*B60N 2/806* (2018.01)
*B60N 2/812* (2018.01)
(Continued)

(52) U.S. Cl.
CPC .......... *B64D 11/0642* (2014.12); *B60N 2/838* (2018.02); *B60N 2/841* (2018.02); *B60N 2/85* (2018.02); *B60N 2/888* (2018.02)

(58) Field of Classification Search
CPC .... B64D 11/0642; B60N 2/838; B60N 2/841; B60N 2/85; B60N 2/888; B60R 2021/0048; B60R 2021/2074
(Continued)

(56) References Cited

U.S. PATENT DOCUMENTS

| 5,669,667 | A | * | 9/1997 | Schmidt | ................. | B60N 2/853 |
| | | | | | | 297/408 X |
| 5,927,804 | A | * | 7/1999 | Cuevas | ................. | B60N 2/888 |
| | | | | | | 297/216.12 |

(Continued)

FOREIGN PATENT DOCUMENTS

| DE | 2209294 A1 | 9/1973 |
| EP | 3301024 A1 | 4/2018 |

OTHER PUBLICATIONS

International Patent Application No. PCT/GB2022/051441, International Search Report and Written Opinion, dated Aug. 25, 2022. United Kingdom Patent Application No. 2108401.7, Search Report, dated Dec. 30, 2021.

*Primary Examiner* — Rodney B White
(74) *Attorney, Agent, or Firm* — Kilpatrick Townsend & Stockton LLP

(57) ABSTRACT

An aircraft seat comprising a headrest having a headrest surface and a backrest having a backrest surface. The headrest is movable relative to the backrest surface between a first position in which the headrest surface is oriented at a first angle to the backrest surface, and a second position in which the headrest surface is oriented at a second angle to the backrest surface. The aircraft seat has a variable length gas strut, configured such that the headrest can be moved between the first position and second position by varying the length of the gas strut. The gas strut comprises an actuatable locking mechanism allowing the headrest to be held at any position between the first position and second position.

(Continued)

Optionally, the gas strut locking mechanism may be actuated by one or more buttons, levers or switches.

14 Claims, 8 Drawing Sheets

(51) Int. Cl.
| | |
|---|---|
| *B60N 2/821* | (2018.01) |
| *B60N 2/838* | (2018.01) |
| *B60N 2/841* | (2018.01) |
| *B60N 2/85* | (2018.01) |
| *B60N 2/888* | (2018.01) |
| *B64D 11/06* | (2006.01) |

(58) Field of Classification Search
USPC ............................................ 297/216.12, 408
See application file for complete search history.

(56) References Cited

U.S. PATENT DOCUMENTS

| | | | | |
|---|---|---|---|---|
| 6,074,011 | A * | 6/2000 | Ptak ......................... | B60N 2/874 |
| | | | | 297/408 X |
| 6,447,068 | B1 * | 9/2002 | Anderson .............. | B60N 2/876 |
| | | | | 297/408 X |
| 6,634,707 | B2 * | 10/2003 | Masuda ................. | B60N 2/853 |
| | | | | 297/216.1 |
| 6,962,392 | B2 * | 11/2005 | O'Connor ............. | B60N 2/888 |
| | | | | 297/408 |
| 8,833,860 | B2 * | 9/2014 | Fey ......................... | B60N 2/865 |
| | | | | 297/408 X |
| 10,668,844 | B2 | 6/2020 | Iossifidis | |
| 2005/0062330 | A1 * | 3/2005 | Eberle ................... | B60N 2/806 |
| | | | | 297/408 |

* cited by examiner

AIRCRAFT SEAT WITH MOVEABLE HEADREST

BACKGROUND OF THE INVENTION

The present invention concerns aircraft seats. More particularly, but not exclusively, this invention concerns an aircraft seat with a moveable headrest.

Aircraft seats with moveable headrests are known. For example, some aircraft headrests can be raised or lowered according to passenger height or preference. Generally, such moveable headrests on aircraft seats fall under two categories.

Firstly, there are manually operated headrests which use friction hinges to hold the headrest in the required position. A disadvantage of manually operated headrests is that in some cases significant physical force is needed to move the headrest to the desired position. This can make adjusting the headrest difficult for some aircraft passengers.

Secondly, there are electronically actuated headrests. A disadvantage of such headrests is that the electronic systems are relatively expensive, complex, and add weight to the overall system. Reduction of the weight of aircraft systems is desirable, as this reduces the overall weight of the aircraft, which contributes to cleaner aviation through a reduction in $CO_2$ emissions.

A moveable headrest should comprise a means of moving the headrest that is simple to operate and reliable. Furthermore, the headrest should be configured in an ergonomic way to provide maximum comfort for the passenger of the aircraft seat.

The present invention seeks to mitigate the above-mentioned problems.

SUMMARY OF THE INVENTION

The present invention provides an aircraft seat comprising a headrest having a headrest surface and a backrest having a backrest surface, wherein the headrest is movable relative to the backrest surface between a first position in which the headrest surface is oriented at a first angle to the backrest surface, and a second position in which the headrest surface is oriented at a second angle to the backrest surface, wherein the aircraft seat further comprises a variable length gas strut, the gas strut being coupled at a first end to the headrest and coupled at a second end to a structure of the aircraft seat such that the headrest can be moved between the first position and second position by varying the length of the gas strut between extended and retracted configurations of the gas strut, wherein the gas strut comprises a locking mechanism having: an unlocked configuration in which the length of the gas strut can be adjusted, thereby allowing movement of the headrest to any position between the first position and second position, and a locked configuration in which the length of the gas strut is locked so that the headrest can be held at any position between the first position and second position.

Locking gas struts, also known as locking gas springs, are well known. Typically, a locking gas strut comprises a barrel and a piston rod wherein the stroke of the gas strut is able to be retracted and extended by moving the piston rod into and out of the barrel to vary the overall length of the gas strut. Gas struts are typically configured such that the resilient bias of the gas strut pushes the piston rod out of the barrel, therefore, if no external force is placed on the gas strut, the equilibrium configuration of the gas strut is one in which the piston rod is fully extended out of the barrel.

Locking gas struts comprise a locking mechanism that operates a valve within the gas strut so that the piston rod can be locked at any stroke position between its fully extended and fully retracted position. The aircraft seat according to the first aspect of the invention uses a locking gas strut to effect movement of the headrest surface of the aircraft seat between a first position and a second position. The locking mechanism of the gas strut is configured to be biased towards the locked configuration, so unless the actuatable member is actuated, the headrest surface will be fixed at or between the first and second positions.

To move the headrest to the first position, a passenger of the aircraft seat simply actuates the actuatable member to move the locking mechanism of the gas strut to the unlocked configuration and pushes the headrest against the resilient bias of the gas strut until the headrest is in the first position. The resilient bias of the gas strut may be such that the weight of the average passenger's head is enough to overcome the resilient biasing force of the gas strut. Alternatively, the passenger may be required to actively exert a force onto the headrest to push against the resilient bias of the gas strut.

To move the headrest to the second position, the actuatable member is actuated to move the locking mechanism of the gas strut to the unlocked configuration. This releases the valve within the gas strut and allows the stroke of the gas strut to extend under the force of the resilient bias of the gas strut.

Furthermore, the locking function of the gas strut means that the headrest can be held at any position between the first and second positions simply by releasing the actuatable member so that the gas strut locking mechanism returns to the locked configuration. This means that the passenger can fix the headrest surface at any angle between the first and second positions. Such a configuration is advantageous because it provides the passenger with the option of choosing a position of the headrest surface that is comfortable for them. It should be understood that the word "releasing" in this context means moving the actuatable member from its actuated state to its unactuated state in which the gas strut locking mechanism is not engaged and the stroke of the gas strut is therefore locked.

A moveable headrest may be particularly advantageous where the backrest of the aircraft seat is also moveable. For example, the aircraft seat may comprise a seat pan, and the backrest may be moveable with respect to the seat pan between an upright, taxi, take-off, and landing (TTL) position and a reclined position. While the first position of the headrest may be comfortable for a passenger when the backrest is in the TTL position, the passenger may wish to orient the headrest in a different position when the backrest is in the reclined position. For example, the passenger may wish to move the headrest to a position in which the headrest better supports their head when the backrest is reclined so that the passenger can more comfortably read or watch a film.

The gas strut used for the invention may also be commonly known as a gas spring. When the locking mechanism is moved to the unlocked position, the gas strut provides a force such that the gas strut is urged to extend in length. It may be that, the gas strut has an extension force of between 60 N and 140 N. It may be that, the gas strut has an extension force of between 80 N and 120 N. It may be that the gas strut has an extension force of at least 100 N.

It may be that, the gas strut has a stroke of at least 10 mm. It may be that the, the gas strut has a stroke of at least 20 mm. It may be that the gas strut has a stroke of at least 30 mm.

Preferably, the aircraft seat further comprises a mechanical linkage comprising an actuatable member located on a surface of the aircraft seat and a trigger configured to move the locking mechanism of the gas strut between the locked configuration and the unlocked configuration upon actuation of the actuatable member.

Preferably, the mechanical linkage comprises an elongate tension member coupled at a first end to the actuatable member and coupled at a second end to the trigger. Actuation of the actuatable member exerts a tensile force on the tension member and causes the tension member to pull the trigger into engagement with the gas strut locking mechanism to move the gas strut locking mechanism from the locked configuration to the unlocked configuration.

The elongate tension member may be coupled to and moveable with the headrest surface. The elongate tension member may be mounted upon headrest surface on a rear side or underside of the headrest surface. The elongate tension member may be mounted internally within the headrest. The underside or rear side of the headrest may have an orifice capable of receiving the elongate tension member. The underside or rear side of the headrest surface may define a plane that is substantially parallel and spaced apart from a plane defined by the headrest surface. The elongate tension member may be coupled to, and run along a rear side of the backrest. The tension member may run in a plane that is substantially parallel to a plane defined by the headrest surface. Alternatively or additionally, the elongate tension member may run in a plane that is substantially parallel to a plane defined by the backrest surface.

Preferably, the trigger is rotatably mounted to the aircraft seat. Advantageously, actuation of the actuatable member causes the tension member to pull the trigger such that it rotates into engagement with the gas strut locking mechanism to move the locking mechanism between the locked configuration and the unlocked configuration. It may be that the trigger is rotatably mounted to a first end of the gas strut. The trigger may be indirectly rotatably mounted to the gas strut. The trigger may be rotatably mounted to a bracket and/or housing. The bracket and/or housing may be mounted onto the headrest or backrest.

Preferably, the tension member passes through the headrest to connect with the actuatable member at a first end of the tension member and to connect with the trigger at the second end of the tension member. The tension member may pass through the headrest to connect with the actuatable member on a first side of the headrest and to connect with the trigger at a second, opposite side of the headrest.

The tension member may be mounted upon the headrest on a rear surface of the headrest, opposite to the headrest surface. The rear surface of the headrest surface may define a plane that is substantially parallel and spaced apart from a plane defined by the headrest surface.

Preferably, the tension member is a Bowden cable. Alternatively or additionally, the tension member is a substantially rigid rod.

It may be that the mechanical linkage further comprises an actuation assembly coupled at a first end to the actuatable member and coupled at a second end to the tension member, wherein the actuation assembly is configured such that actuation of the actuatable member causes the actuation assembly to exert the tensile force on the tension member.

Preferably, the actuatable member is a button on the headrest surface. The button may be positioned proximal to a side edge of the headrest surface. This allows the button to be close to the head of a passenger that is seated in the seat, but away from the region of the headrest surface that a passenger would rest their head against. Having the button placed proximal to a side edge of the headrest surface allows for the button to be actuated comfortably by the passenger. There may be at least two buttons on the headrest. A first button of the at least two buttons may be placed such that it is on the right hand side of a passenger, when they are seated in the seat. A second button of the at least two buttons may be placed such that it is on the left hand side of a passenger, when they are seated in the seat. Having two buttons on the headrest, one on the left hand side of the passenger, and one on the right hand side of the passenger, allows the passenger to actuate the headrest with either their left hand or their right hand comfortably. Having the actuatable member in the headrest surface advantageously allows for use of a shorter tension member (compared to, say, having a button on the seat pan), and reduces the complexity in the routing of the tension member along the aircraft seat.

It may be that the button is has a surface area that sufficiently large, such that it can be depressed by the palm of a passenger's hand. In this connection, the button may have a surface area of at least 30 cm$^2$.

Preferably, the headrest further comprises a grip adjacent to the button. The grip being adjacent the button allows for the button to be pushed whilst the passenger is holding onto the grip. Such a grip helps the button to be easily located when the button is out of sight from the passenger. It may be that the grip is positioned on a rear or underside of the headrest. It may be that the grip is substantially parallel to a plane defined by the headrest surface.

It may be that the grip is configured to be squeezed upon actuation of the button by a passenger. In other words, the grip may be configured such that the palm of a passenger's hand depresses the button when a passenger squeezes the grip. This is a particularly ergonomic design, and helps reduce strain in the passenger's wrist as they manoeuvre the headrest. As such, the button may be located on one of the headrest surface or rear surface of the headrest, and the grip may be located on the other one of the headrest surface or rear surface of the headrest. The grip may be on a plane that is substantially parallel to a plane defined by the headrest surface. Both the grip and the button may pass through an axis that is perpendicular to said plane.

Preferably, the actuatable member comprises a handle or lever that is configured to be pushed or pulled. It may be that the handle or lever is configured such that, in use, the handle or lever is actuated by pulling the handle towards the passenger, or pushing the handle away from the passenger. This is an ergonomic design, and allows the passenger to manipulate the headrest without causing strain to their wrist. It may be the case that the handle being actuated by pulling the handle towards the passenger may allow for more control over the movement of the headrest.

In the case where the actuatable member is a lever, it may be suspended such that it hangs under the seat pan. Alternatively or additionally, the actuatable member may be a button or lever positioned on an edge of the headrest surface. Alternatively or additionally, the actuatable member may be a button, switch or lever positioned on an edge of the seat pan. Where the actuatable member is located on the seat pan, it may be the case that the tension member is configured to run along an underside of the seat pan.

Alternatively or additionally, the aircraft seat may comprise at least two actuatable members. The at least two actuatable members may be a button, switch, or lever, or any combination thereof. The at least two actuatable members may be located on one or more of the headrest surface, under the seat pan, be on an edge of the seat pan, or any combination thereof.

Preferably, the first end of the gas strut is pivotally connected to the headrest. It may be that the gas strut is pivotally connected to the headrest at a location on the headrest that is off centre with respect to the centre of the headrest surface. This can help the gas strut be close to the actuatable members of the headrest, when they are on an edge of the headrest surface, for example. This helps reduce the length of the elongate tension member, and thus makes the routing the elongate tension member between the actuatable member and the gas strut simpler. Placing the gas strut away from the centre of the headrest surface also helps to mount the gas strut away from safety equipment such as seatbelt mechanisms and the like, which may be mounted on the backrest on an opposite, distal side to the backrest surface.

Preferably, the gas strut is coupled at a second end of the gas strut to the backrest of the aircraft seat. Even more preferably, the second end of the gas strut is pivotally connected to the backrest. It may be that the gas strut is pivotally connected to a rear side of the backrest. It may be that the gas strut is positioned on the backrest, on an opposite, distal side to the backrest surface. It may be that the gas strut is substantially parallel to the backrest surface.

Preferably, the headrest is pivotally mounted to the backrest and pivotable between the first and second positions. The headrest may be pivotally mounted to the backrest by one or more hinges. The headrest surface may rotate about an axis adjacent to an edge of the headrest surface and an edge of the backrest surface as the headrest is moved between the first position and the second position.

Preferably, the gas strut comprises a piston rod moveable in relation to a barrel, and a wherein at the first end of the gas strut the piston rod is coupled to the headrest on a rear or underside surface of the headrest, and wherein at the second end of the gas strut the barrel is coupled to the structure of the aircraft seat.

Preferably, the gas strut locking mechanism is located on the piston rod, at the first distal end of the gas strut. It may be that the locking mechanism is a switch located on the piston rod. Preferably, the locking mechanism is located at the first distal end of the gas strut. Alternatively or additionally, the locking mechanism may be located at the second, opposite distal end of the gas strut. Having the locking mechanism located on the piston rod itself allows for a compact design, and allows the mounting point between the piston rod and the aircraft seat to accommodate the mounting of the elongate tension member.

Preferably, the first angle is substantially zero degrees such that the first position corresponds to one in which the headrest surface is oriented substantially parallel with the backrest surface. The first position may correspond to one in which the headrest surface is substantially flush with the backrest surface. This allows the headrest surface and backrest surface to form one continuous surface in the first position. Alternatively, the first position may correspond to one in which the headrest surface is oriented at an angle to the backrest surface. For example, the headrest surface may be oriented at an angle of less than approximately 10 degrees to the backrest surface when in the first position. The headrest surface may be oriented at an angle of less than approximately 5 degrees to the backrest surface when in the first position.

The headrest surface may be oriented at an angle of more than 10 degrees to the backrest surface when in the second position. The headrest surface may be oriented at an angle of more than approximately 20 degrees to the backrest surface when in the second position. The headrest surface may be oriented at an angle of less than approximately 40 degrees to the backrest surface when in the second position. For example, in some embodiments, the second angle may be approximately 25 degrees, while in other embodiments, the second angle may be approximately 30 degrees. However, in some embodiments the second angle may be substantially zero degrees, in which case the headrest may rotate backwards to a negative first angle. The angle between the headrest surface and backrest surface may be measured in a forwards direction from the perspective of a passenger sitting in the aircraft seat.

Preferably, the range of movement of the headrest surface between the first position and second position, is at least approximately 10 degrees. Preferably, the range of movement of the headrest surface between the first position and second position is at least approximately 20 degrees. Preferably, the range of movement of the headrest, between the first position and second position is less than 40 degrees.

DESCRIPTION OF THE DRAWINGS

Embodiments of the present invention will now be described by way of example only with reference to the accompanying schematic drawings of which.

DETAILED DESCRIPTION

Figure 1:
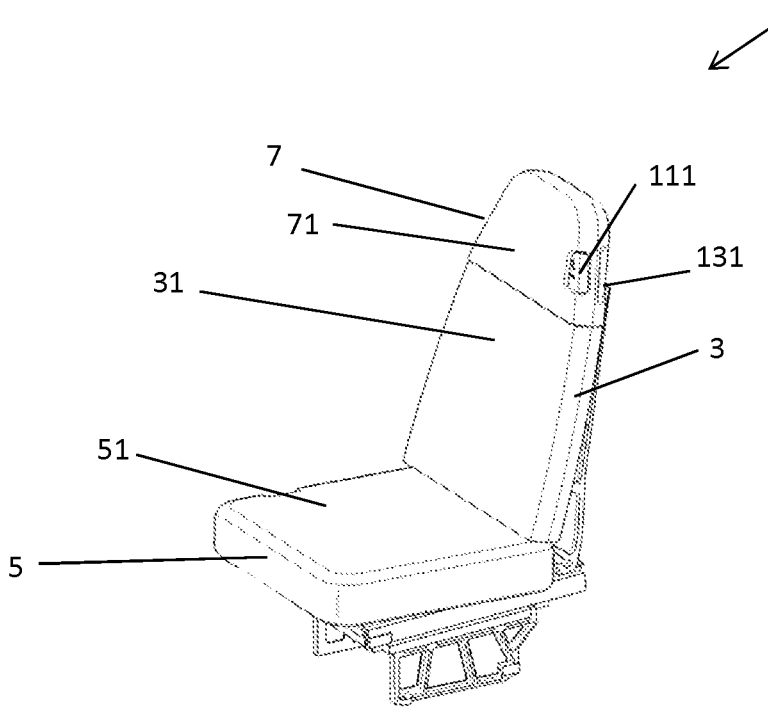
FIG. 1 shows an aircraft seat according to a first embodiment of the invention with the headrest of the aircraft seat in a first position in which the headrest surface is flush with the backrest surface of the aircraft seat.
Figure 2:
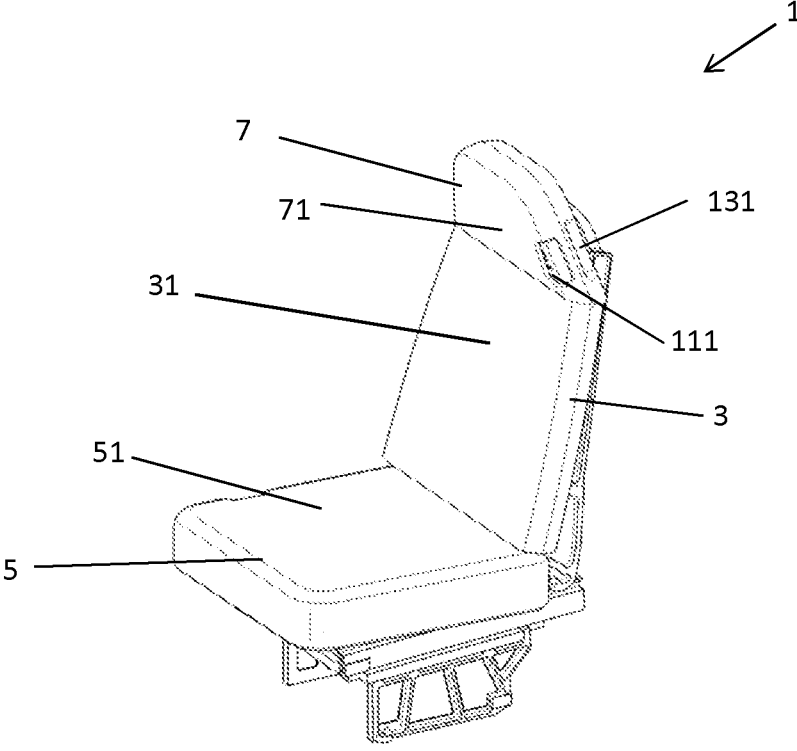
FIG. 2 shows an aircraft seat in FIG. 1, where the headrest is in a second position in which the headrest surface is tilted with respect to the backrest surface.

An aircraft seat 1 according to an embodiment of the invention is shown in FIG. 1. The aircraft seat 1 comprises a backrest 3, a seat pan 5, and a headrest 7. When seated upon seat pan surface 51 of the seat pan 5, a passenger of the aircraft seat can rest their back against backrest surface 31 of the backrest 3 and their head against headrest surface 71 of the headrest 7. As described in more detail below, the headrest 7 is configured to be moveable between a first, flush position, shown in FIG. 1, where the headrest surface 71 is oriented flush with the backrest surface 31, and a second, tilted position, shown in FIG. 2, in which the headrest surface 71 is oriented at an angle of approximately 25 degrees to the backrest surface 31. While the aircraft seat 1 is shown in FIG. 1 and FIG. 2 with the backrest 3 as being unmoved when the headrest has been moved between its first and second positions, it should be understood that the backrest 3 is independently moveable with respect to the seat pan 5 between an upright TTL position and a reclined position. However, in other embodiments of the invention, backrest may be fixed with respect to the seat pan.

Figure 3:
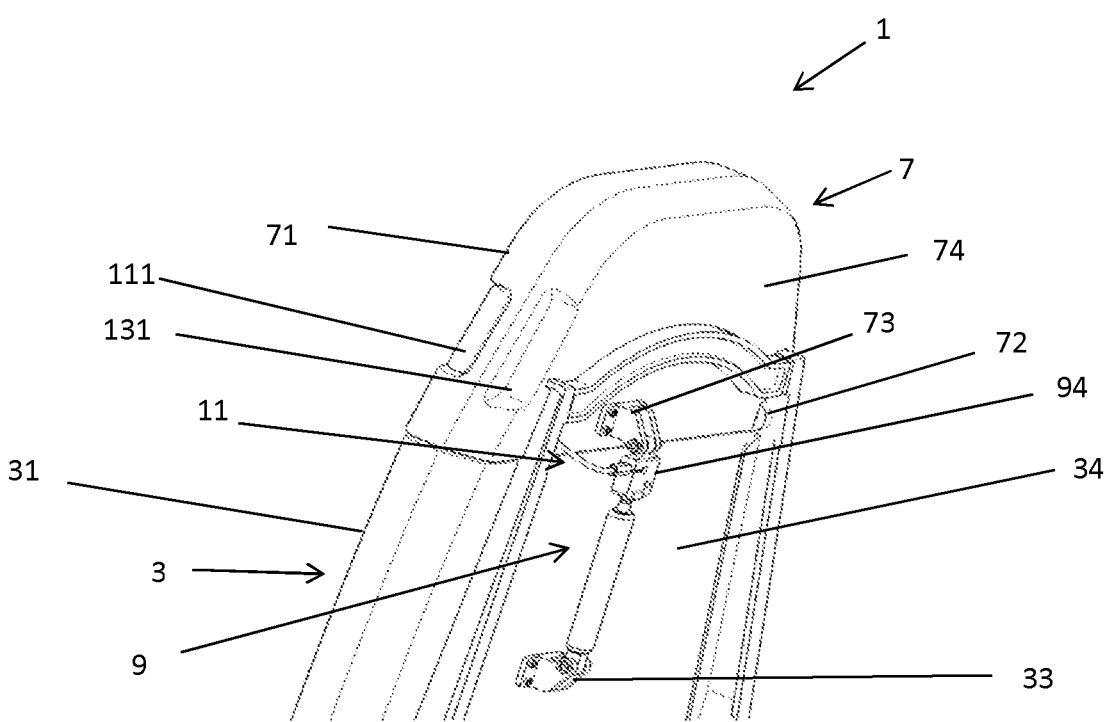
FIG. 3 corresponds to the aircraft seat of FIG. 1, but from a rear view of the seat.
Figure 4:
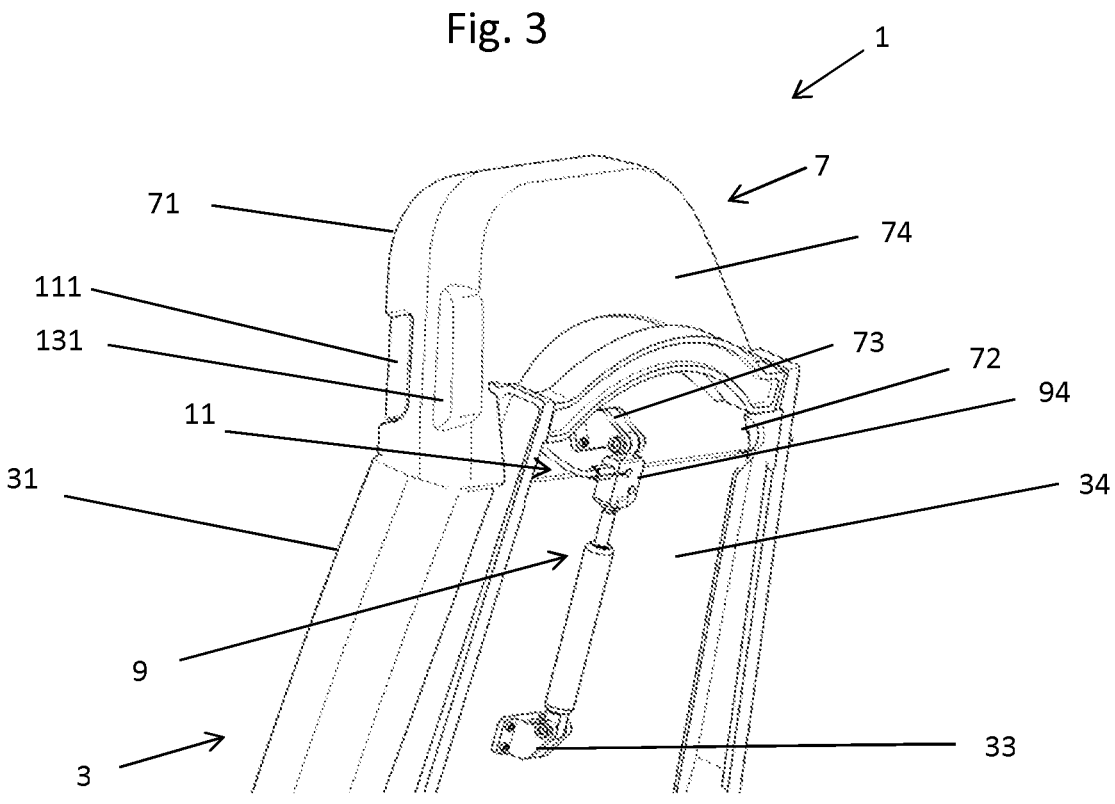
FIG. 4 corresponds to the aircraft seat of FIG. 2, but from a rear view of the seat.
Figure 5:
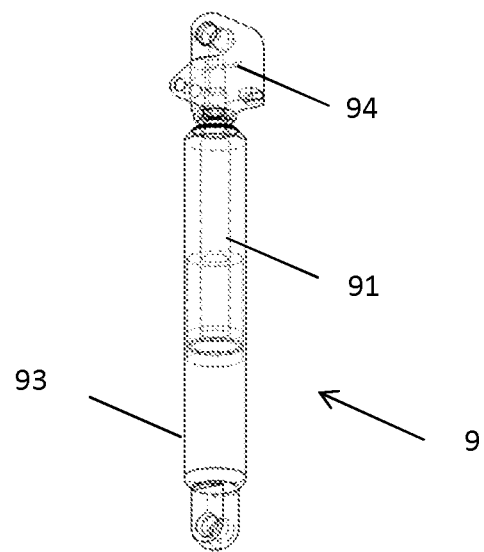
FIG. 5 corresponds to an isolated view of the gas strut shown in FIG. 3.
Figure 6:
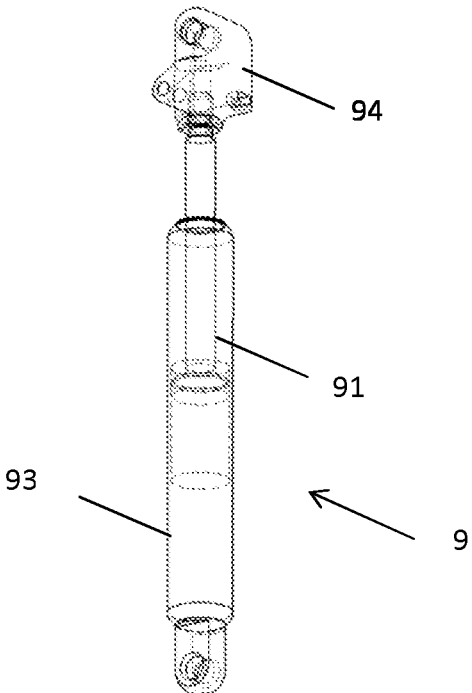
FIG. 6 corresponds to an isolated view of the gas strut shown in FIG. 4.

The headrest 7 is mounted to the backrest 3 by a pair of hinges 72 as shown in FIG. 3 and FIG. 4 (note that only one hinge is visible in FIG. 3). The headrest 7 can be fixed at any position between the flush position and the tilted position by means of the locking gas strut 9 and mechanical linkage 11 arrangement which are also shown in FIG. 3 and FIG. 4. The gas strut 9, which is shown in more detail in FIG. 5 and FIG. 6, comprises a barrel 93, a piston rod 91, and a trigger assembly 94. At the upper end of the gas strut 9, the piston rod 91 of the gas strut 9 is coupled to a trigger assembly 94 that is fixed to the rear side 74 of the headrest 7 via a headrest bracket 73, as described below. At the lower end of the gas strut 9, the barrel 93 of the gas strut 9 is fixed to a backrest bracket 33 on the rear side 34 of the backrest 3. The gas strut 9 is configurable between an extended stroke configuration in which the piston rod 91 projects out of the barrel 93 in vertically upwards direction relative to the aircraft seat, shown in FIG. 4 and FIG. 6, and a retracted stroke configuration, shown in FIG. 3 and FIG. 5, in which the piston rod 91 is contained substantially within the barrel 93 in order to move the headrest between the flush position, which is shown in FIG. 3, and the tilted position, which is shown in FIG. 4.

Figure 7:
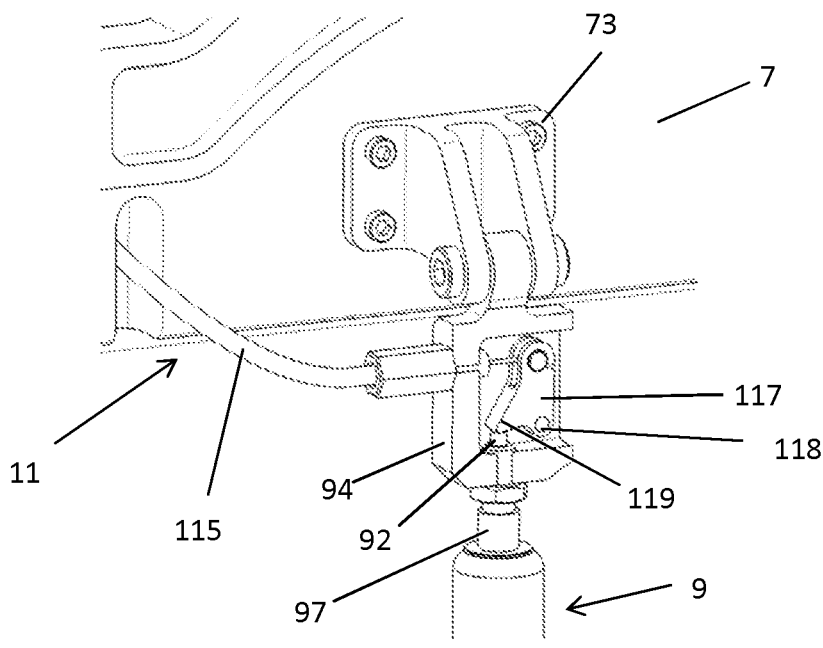
FIG. 7 corresponds to a detailed view of the trigger assembly of the mechanical linkage in a locked configuration.
Figure 8:
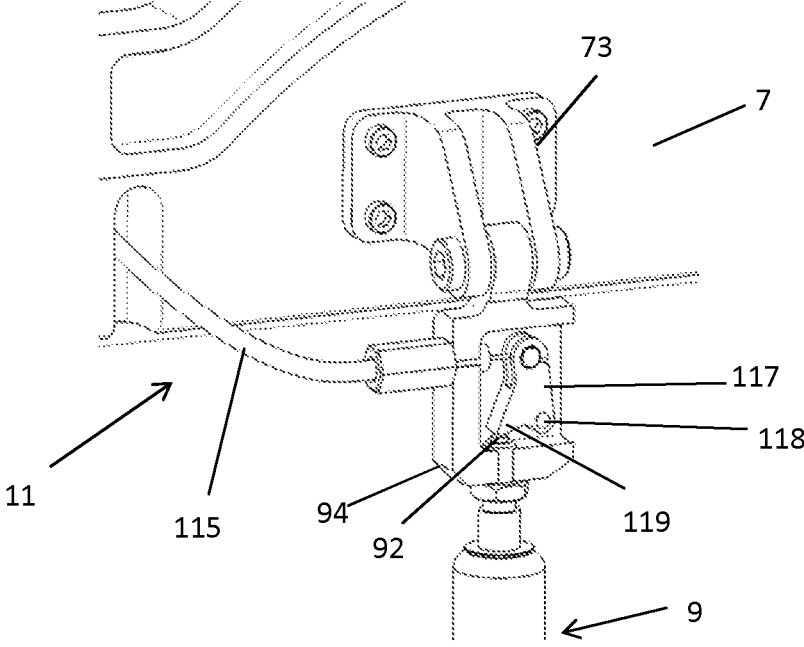
FIG. 8 corresponds to a detailed view of the trigger assembly of the mechanical linkage in an unlocked configuration.

FIG. 7 and FIG. 8 show detailed views of the trigger assembly 94 of the gas strut 9. The trigger assembly 94 is mounted at one end to the gas strut 9, and at another end to a headrest bracket 73, that is mounted on a rear side 74 of the headrest 7. The gas strut 9 comprises a release pin 92 which acts as a switch that operates a valve within the gas strut 9 to lock the gas strut 9 at any stroke configuration between the extended and retracted configurations, as will be well understood by the skilled person. The default position of the release pin 92 is a locked position in which the stroke of the gas strut 9 is locked. To move the piston rod 91 from the extended configuration to the retracted configuration, the release pin 92 must be actuated to an unlocked position and the piston rod 91 must be pushed into the barrel 93, against the resilient bias of the gas strut 9. The gas strut 9 can be held at any position between its extended position and its retracted position by releasing the release pin 92 so that it returns to the unlocked position. When the release pin 92 is actuated to the unlocked position and no force is applied to the gas strut 9, the resilient bias of the gas strut 9 pushes the piston rod 91 to its extended stroke position shown in FIG. 6.

As shown in FIG. 7 and FIG. 8, the mechanical linkage 11 comprises a Bowden cable 115. The Bowden cable 115 is connected at its first end to a trigger 117 of the trigger assembly 94. Trigger 117 is rotatably mounted within the trigger assembly 94 upon the trigger mounting point 118. The Bowden cable 115 is configured such that when it is pulled, the Bowden cable pulls the trigger 117, causing the trigger 117 to rotate about its pivot point (anti-clockwise as shown in FIG. 8), and thereby rotating the protruding edge 119 into engagement with the release pin 92 to actuate the release pin 92.

Figure 9:
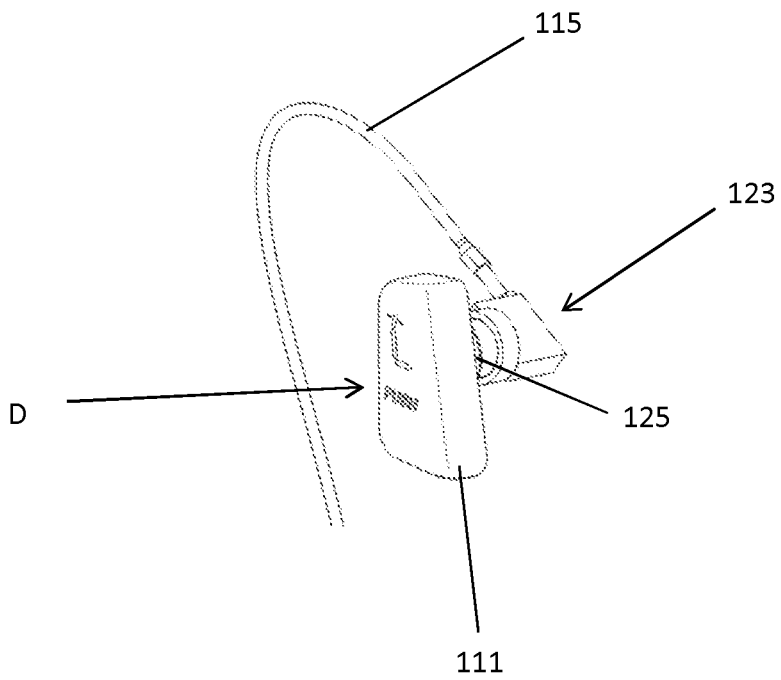
FIG. 9 shows the button, actuation assembly and Bowden cable of the aircraft seat in isolation.

The Bowden cable 115 is connected at its second, opposite end to actuation assembly 123, as shown in FIG. 9. Mounted to the actuation assembly is actuation pad 125, which sits behind the button 111 so that when the button 111 is pushed, the actuation pad 125 is pushed. The actuation assembly 123 comprises a conventional rotatable cam assembly (not shown) which is connected between the actuation pad 125 and the Bowden cable 115 and is configured to translate the push of the actuation pad 125 in direction D into a pull on the Bowden cable 115. The button 111 is positioned on a side surface of the headrest 7, as shown in FIG. 1 to FIG. 4. The button 111 is thereby located in an ergonomic and convenient position for the passenger of the aircraft seat 1 to be able to operate. Adjacent to button 111, on at the rear of the headrest a cut-out provides a grip 131 which facilitates actuation of the button 111.

With the aircraft seat 1 configured as described, a passenger of the aircraft seat 1 can change the angle the headrest 7 by pressing the button 111 to move the release pin 92 to its unlocked position. To move the headrest 7 towards the tilted position, the passenger simply allows the resilient bias of the gas strut 9 to extend the stroke of the gas strut. To move the headrest 7 towards the flush position, the passenger must push the headrest 7 against the resilient bias of the gas strut 9 to retract the stroke of the gas strut. The gas strut 9 can be locked in any given position by releasing the button 111 so that the headrest surface 71 can be fixed at any position between its flush position, shown in FIG. 1 and its tilted position, shown in FIG. 2.

Figure 10:
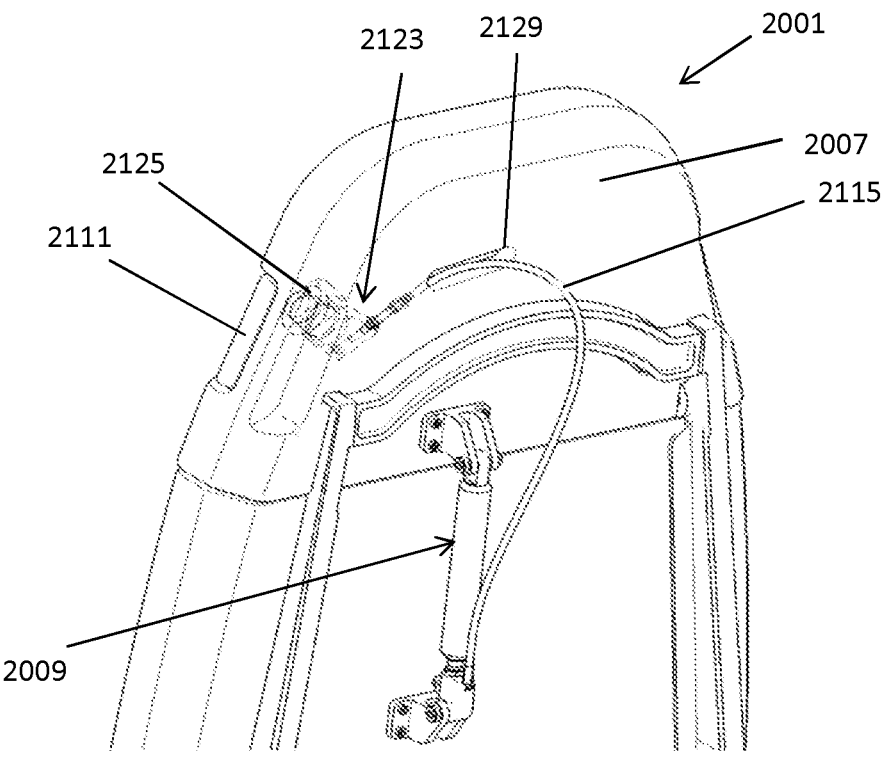
FIG. 10 shows a rear view of an aircraft seat according to a second embodiment of the invention with the headrest in a first position in which the headrest surface is flush with the backrest surface of the aircraft seat.

An aircraft seat 2001 according to a second embodiment of the invention is shown in FIG. 10. Where the aircraft seat 2001 has features in common with the aircraft seat 1 of the first embodiment of the invention, those features are labelled with like reference numerals but with 2000 added to the reference numeral number. The aircraft seat 2001 of the second embodiment of the invention is substantially identical to the aircraft seat of the first embodiment of the invention 1. However, the gas strut 2009 is rotated approximately 180 degrees when compared to the gas strut 9 of the first embodiment of the invention Compared to the first embodiment, this embodiment requires a longer Bowden cable 2115. The Bowden cable 2115 enters the headrest 2007 through opening 2129, where it is connected to the actuation assembly 2123, which is positioned behind the button 2111 such that when the button 2111 is depressed, the actuation pad 2125 is depressed, which causes the mechanical means (not shown) within the actuation assembly 2123 to pull on the Bowden cable 2115.

Figure 11:
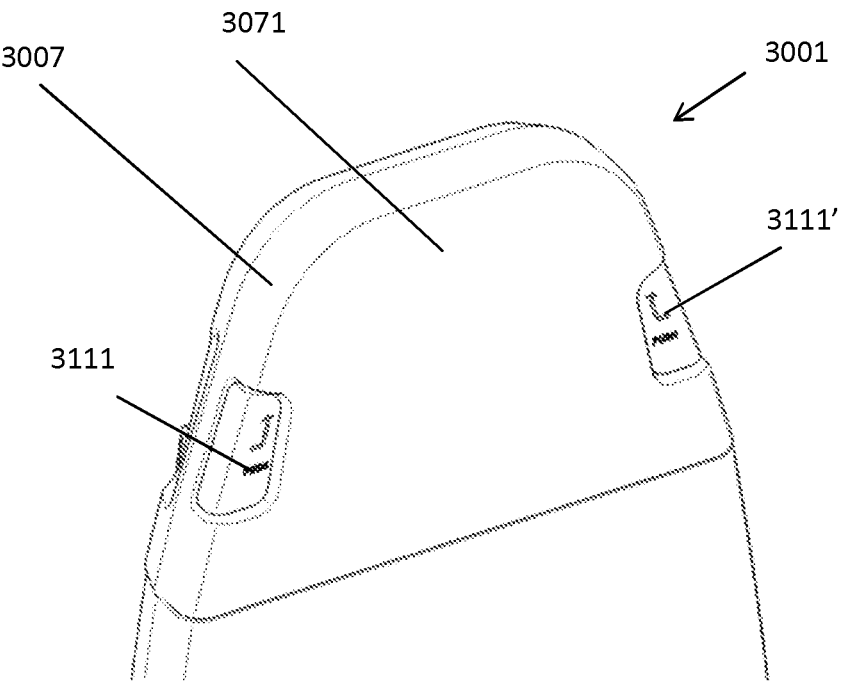
FIG. 11 shows a front view of an aircraft seat according to a third embodiment of the invention with the headrest in a first position in which the headrest surface is flush with the backrest surface of the aircraft seat, wherein the headrest surface has two buttons.

An aircraft seat 3001 according to a third embodiment of the invention is shown in FIG. 11. Where the aircraft seat 3001 has features in common with the aircraft seat 1 of the first embodiment of the invention, those features are labelled with like reference numerals but with 3000 added to the reference numeral number. Only elements which have been altered with respect to the first embodiment will now be described.

Instead of having a single button, the headrest 3007 has two buttons 3111 and 3111' which are both coupled to the gas strut 3009 via a Bowden cable. Having two buttons 3111 and 3111' on the headrest surface 3071 allows the passenger to comfortably actuate the headrest with either their left or right hands.

Figure 12:
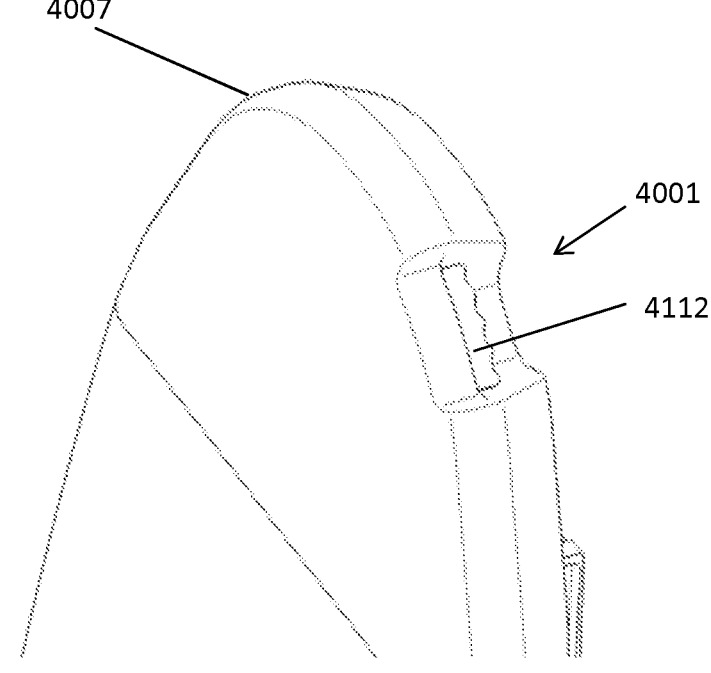
FIG. 12 shows a front view of an aircraft seat according to a fourth embodiment of the invention with the headrest in a first position in which the headrest surface is flush with the backrest surface of the aircraft, wherein the headrest surface has an actuatable handle.
Figure 13:
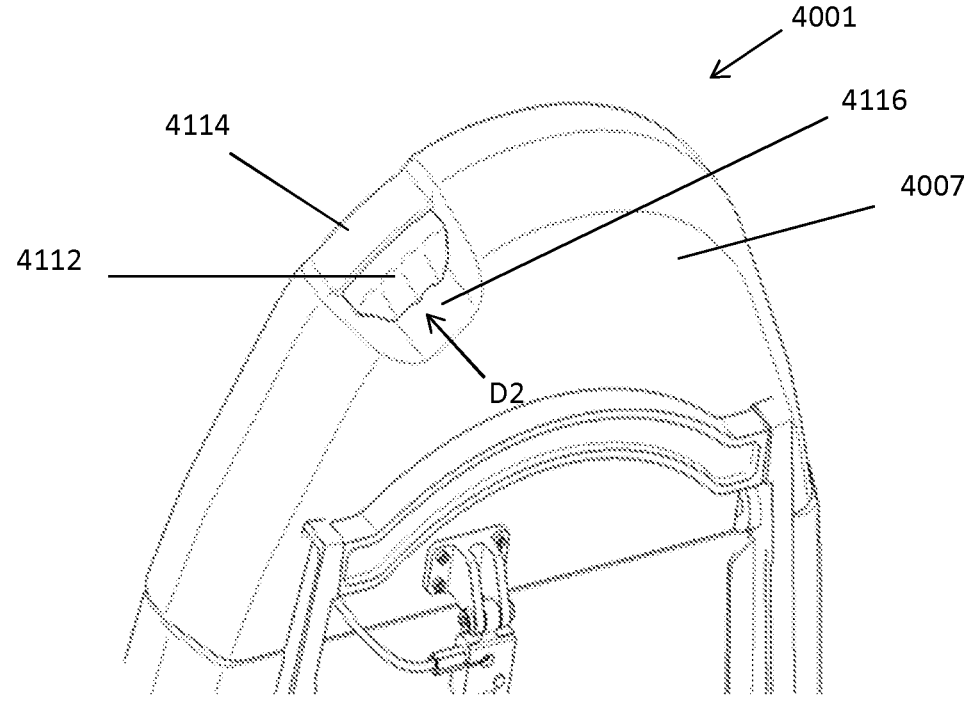
FIG. 13 shows a rear view of an aircraft seat according to a fourth embodiment of the invention with the headrest in a first position in which the headrest surface is flush with the backrest surface of the aircraft, wherein the headrest surface has an actuatable handle.

An aircraft seat 4001 according to a fourth embodiment of the invention is described in FIG. 12 and FIG. 13. Where the aircraft seat 4001 has features in common with the aircraft seat 1 of the first embodiment of the invention, those features are labelled with like reference numerals but with 4000 added to the reference numeral number. Only elements which have been altered with respect to the first embodiment will now be described.

Instead of having a button on the headrest, the headrest 4007 of the fourth embodiment of the invention has an actuatable handle 4112. There is a recess 4116 on a rear side of the headrest 4007 that accommodates the handle 4112. The mechanical linkage is substantially identical that used in the first and second embodiments of the invention. However, the headrest 4007 is moved by a passenger resting their palm against palm rest 4114, placing their fingers on the handle 4112, and pulling the handle in direction D2, to actuate the gas strut. Releasing the handle 4112 locks the headrest in place. The handle 4112 has a number of grooves to ergonomically accommodate the passenger's fingers.

Figure 14:
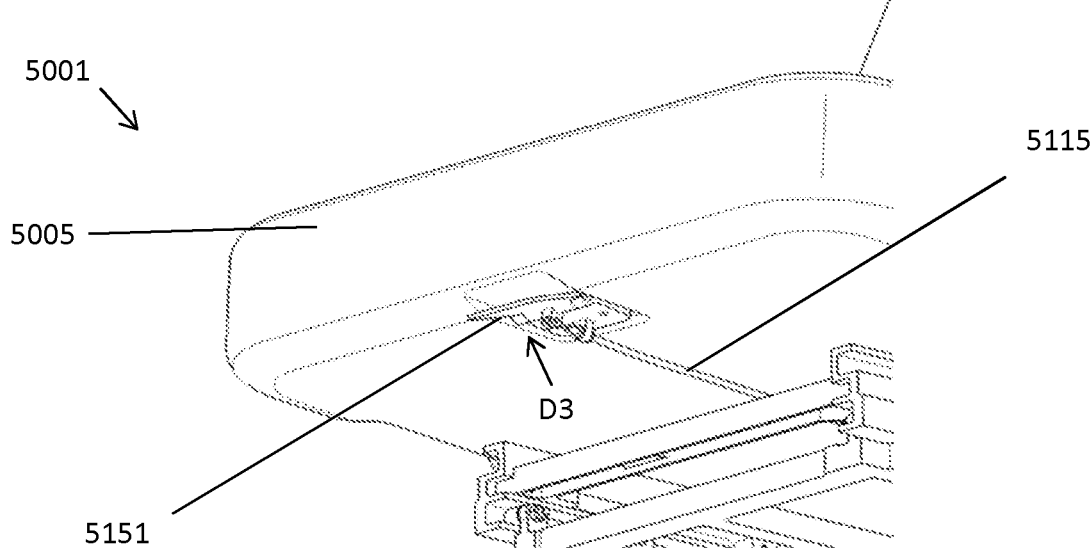
FIG. 14 shows an underside view of an aircraft seat according to a fifth embodiment of the invention where the actuatable member is a lever suspended under the seat pan.

The aircraft seat 5001 according to a fifth embodiment of the invention is described in FIG. 14. Where the aircraft seat 5001 has features in common with the aircraft seat 1 of the first embodiment of the invention, those features are labelled with like reference numerals but with 5000 added to the reference numeral number. Only elements which have been altered with respect to the first embodiment will now be described.

Instead of a button, the fifth embodiment of the invention has an actuation lever 5151 that is suspended below an underside of the seat pan 5005, and connected to the gas strut (not shown) by Bowden cable 5115, which runs under an underside of the seat pan 5005. Configured as such, a passenger of the aircraft seat 5001 can move the headrest (not shown) to a tilted position with respect to the seat pan 5005, and the backrest (not shown), by pulling on the actuation lever 5151 in a direction D3 to move the release pin of the gas strut to its unlocked position. The gas strut can then be locked in any given position by releasing the actuation level 5151.

Figure 15:
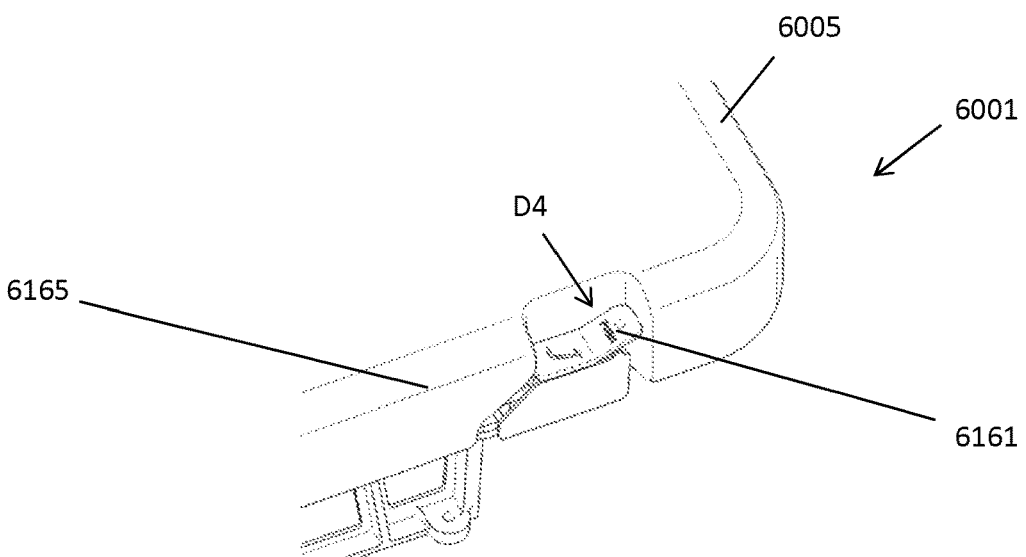
FIG. 15 is a view of an aircraft seat according to a sixth embodiment of the invention where the actuatable member is a switch on an edge of the seat pan.

An aircraft seat 6001 according to a sixth embodiment of the invention is shown in FIG. 15. Where the aircraft seat 6001 has features in common with the aircraft seat 1 of the first embodiment of the invention, those features are labelled with like reference numerals but with 6000 added to the reference numeral number. Only elements which have been altered with respect to the first embodiment will now be described.

The sixth embodiment of the invention has an actuation switch 6161 that is located on an edge 6165 of the seat pan 6005, and connected to the gas strut (not shown) by a Bowden cable (not shown), which runs under an underside of the seat pan 6005. Configured as such, a passenger of the aircraft seat 6001 can move the headrest (not shown) to a tilted position with respect to the seat pan 6005, and the backrest (not shown), by pushing on the actuation switch 6161 in a direction D4 towards the seat pan to operate the gas strut.

Figure 16:
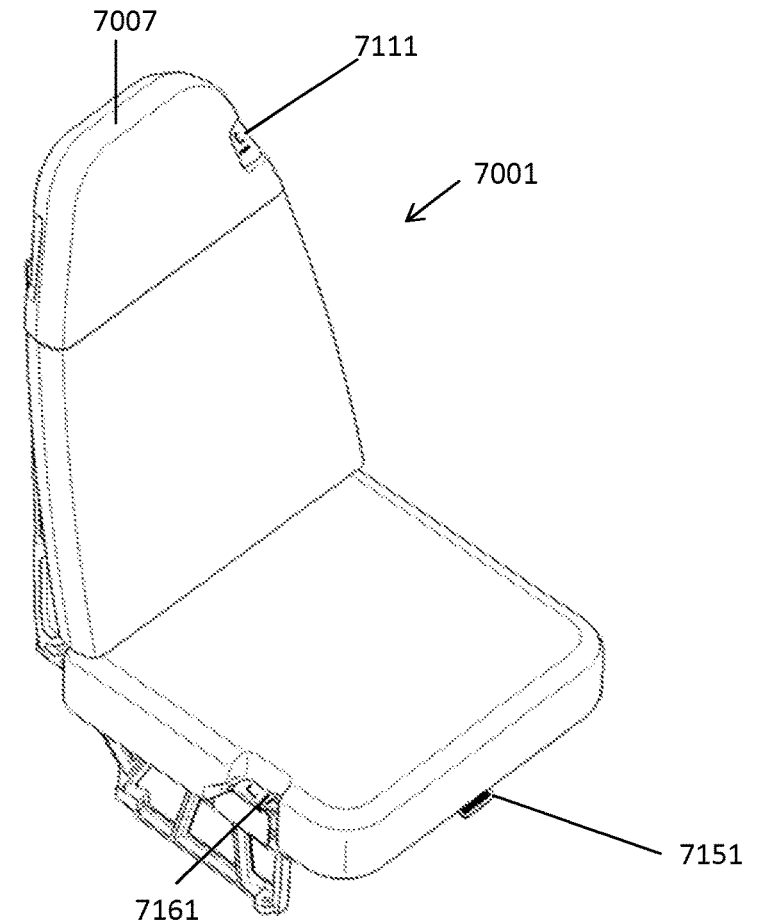
FIG. 16 is a view of an aircraft seat according to a seventh embodiment of the invention where there are multiple actuatable members including a switch, a button and a lever.

An aircraft seat 7001 according to a seventh embodiment of the invention is shown in FIG. 16. Where the aircraft seat 7001 has features in common with the aircraft seat 1 of the first embodiment of the invention, those features are labelled with like reference numerals but with 7000 added to the reference numeral number. Only elements which have been altered with respect to the first embodiment will now be described.

The aircraft seat of the seventh embodiment of the invention is substantially the same as those shown in FIG. 1 and FIG. 2. However, in the seventh embodiment of the invention, the aircraft seat is configured such that the headrest 7007 is moveable via operation of a button 7111, a switch 7161, or a lever 7151. This gives the passenger more options and allows them control the headrest in a way which they find comfortable and ergonomic.

Whilst the present invention has been described and illustrated with reference to particular embodiments, it will be appreciated by those of ordinary skill in the art that the invention lends itself to many different variations not specifically illustrated herein. For example, in other embodiments of the invention, the locking gas strut is oriented such that the piston rod projects out of the barrel in a vertically downwards direction, so that the barrel of the gas strut is located above the piston rod.

Whilst in embodiments of the present invention, the mechanical linkage is shown to comprise a Bowden cable, it should be understood that an alternative embodiments not shown herein may use a substantially rigid rod to transmit force to the trigger. The mechanical linkage and or the substantially rigid rod may optionally comprise a pivot linkage.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft seat comprising a headrest having a headrest surface and a backrest having a backrest surface,
   wherein the headrest is movable relative to the backrest surface between a first position in which the headrest surface is oriented at a first angle to the backrest surface, and a second position in which the headrest surface is oriented at a second angle to the backrest surface,
   wherein the aircraft seat further comprises a variable length gas strut, the gas strut being coupled at a first end to the headrest and coupled at a second end to a structure of the aircraft seat such that the headrest can be moved between the first position and second position by varying the length of the gas strut between extended and retracted configurations of the gas strut, wherein the gas strut comprises a locking mechanism having:

an unlocked configuration in which the length of the gas strut can be adjusted, thereby allowing movement of the headrest to any position between the first position and second position, and a locked configuration in which the length of the gas strut is locked so that the headrest can be held at any position between the first position and second position, wherein the aircraft seat further comprises a mechanical linkage comprising an actuatable member located on a surface of the aircraft seat and a trigger configured to move the locking mechanism of the gas strut between the locked configuration and the unlocked configuration upon actuation of the actuatable member, and wherein the mechanical linkage comprises an elongate tension member coupled at a first end to the actuatable member and coupled at a second end to the trigger such that actuation of the actuatable member exerts a tensile force on the tension member and causes the tension member to pull the trigger into engagement with the gas strut locking mechanism to move the gas strut locking mechanism from the locked configuration to the unlocked configuration.

2. An aircraft seat according to claim 1, wherein the trigger is rotatably mounted to the aircraft seat and wherein actuation of the actuatable member causes the tension member to pull the trigger such that the trigger rotates into engagement with the gas strut locking mechanism.

3. An aircraft seat according to claim 2, wherein the tension member passes through the headrest to connect with the actuatable member on a first side of the headrest and to connect with the trigger at a second, opposite side of the headrest.

4. An aircraft seat according to claim 1, wherein the actuatable member comprises a button on the headrest surface.

5. An aircraft seat according to claim 4, wherein the headrest further comprises a grip adjacent to the button.

6. An aircraft seat according to claim 1, wherein the actuatable member comprises a handle or lever that is configured to be pushed or pulled.

7. An aircraft seat according to claim 1, wherein the first end of the gas strut is pivotally connected to the headrest.

8. An aircraft seat according to claim 1, wherein the gas strut is coupled at a second end of the gas strut to the backrest of the aircraft seat.

9. An aircraft seat according to claim 8, wherein the second end of the gas strut is pivotally connected to the backrest.

10. An aircraft seat according to claim 1, wherein the headrest is pivotally mounted to the backrest and pivotable between the first and second positions.

11. An aircraft seat according to claim 1, wherein the gas strut comprises a piston rod moveable in relation to a barrel, and wherein at the first end of the gas strut the piston rod is coupled to the headrest on a rear or underside surface of the headrest, and wherein at the second end of the gas strut the barrel is coupled to the structure of the aircraft seat.

12. An aircraft seat according to claim 11, wherein the gas strut locking mechanism is located on the piston rod, at the first end of the gas strut.

13. An aircraft seat according to claim 1, wherein the first position corresponds to one in which the headrest surface is oriented substantially parallel to the backrest surface.

14. An aircraft seat according to claim 1, wherein the tension member passes through the headrest to connect with the actuatable member on a first side of the headrest and to connect with the trigger at a second, opposite side of the headrest.

* * * * *